(12) United States Patent
Davidson et al.

(10) Patent No.: US 9,621,869 B2
(45) Date of Patent: Apr. 11, 2017

(54) SYSTEM AND METHOD FOR RENDERING AFFECTED PIXELS

(71) Applicants: Alan L. Davidson, Sherman Oaks, CA (US); Parag Havaldar, Cerritos, CA (US); Peter H. Palombi, Los Angeles, CA (US); Josh Wills, Manhattan Beach, CA (US)

(72) Inventors: Alan L. Davidson, Sherman Oaks, CA (US); Parag Havaldar, Cerritos, CA (US); Peter H. Palombi, Los Angeles, CA (US); Josh Wills, Manhattan Beach, CA (US)

(73) Assignees: SONY CORPORATION, Tokyo (JP); SONY PICTURES TECHNOLOGIES INC., Culver City, CA (US)

( * ) Notice: Subject to any disclaimer, the term of this patent is extended or adjusted under 35 U.S.C. 154(b) by 999 days.

(21) Appl. No.: 13/649,720

(22) Filed: Oct. 11, 2012

(65) Prior Publication Data
US 2013/0314501 A1    Nov. 28, 2013

Related U.S. Application Data

(60) Provisional application No. 61/651,361, filed on May 24, 2012.

(51) Int. Cl.
*H04N 13/02* (2006.01)
*H04N 13/00* (2006.01)

(52) U.S. Cl.
CPC ..... *H04N 13/0011* (2013.01); *H04N 13/0018* (2013.01)

(58) Field of Classification Search
CPC . H04N 13/0018; H04N 13/0011; H04N 13/02
(Continued)

(56) References Cited

U.S. PATENT DOCUMENTS 6,424,351 B1 * 7/2002 Bishop et al. ............... 345/582
2003/0095119 A1 * 5/2003 Jeong et al. ................. 345/419
(Continued)

FOREIGN PATENT DOCUMENTS

CN      102325259      1/2012
EP      2348743 A1     1/2010
GB      2448717 A      10/2008

*Primary Examiner* — Tung Vo
*Assistant Examiner* — Zaihan Jiang
(74) *Attorney, Agent, or Firm* — Mark D. Wieczorek; Mayer & Williams PC

(57) ABSTRACT

Systems and methods are provided for minimizing re-projection artifacts. From a re-projection method, a distortion map determines areas of excessive stretching or compressing of pixels, which are then rendered. The re-projection and render are composited to create a new stereo image. Systems and methods are also provided for a "depth layout" process, whereby a new offset view of a 2D plate is created, allowing a stereo pair of images. Custom geometry that approximates the scene is created and 2D rotoscoping is employed to cut out shapes from the geometry. A depth map is created, from which an offset image may be re-projected, resulting in a stereo pair. Systems and methods are also provided for a fast re-projection technique, which creates a novel view from an existing image. The process generates a disparity map and then a distortion map, which is then used to create the new view.

14 Claims, 15 Drawing Sheets

(58) Field of Classification Search
USPC .......................................... 348/46, E13.075
See application file for complete search history.

(56) References Cited

U.S. PATENT DOCUMENTS

| | | |
|---|---|---|
| 2009/0262108 A1* | 10/2009 | Davidson et al. ............ 345/419 |
| 2011/0096832 A1* | 4/2011 | Zhang et al. ............ 375/240.08 |
| 2012/0056871 A1* | 3/2012 | Chen .............................. 345/419 |
| 2012/0176366 A1* | 7/2012 | Genova ......................... 345/419 |
| 2012/0176367 A1* | 7/2012 | Genova et al. ............... 345/419 |
| 2012/0176368 A1* | 7/2012 | Genova ......................... 345/419 |
| 2012/0176473 A1* | 7/2012 | Genova et al. ................. 348/46 |
| 2013/0009943 A1* | 1/2013 | Li et al. ........................ 345/419 |
| 2013/0187910 A1* | 7/2013 | Raymond et al. ............ 345/419 |

* cited by examiner

[TOP VIEW]

SYSTEM AND METHOD FOR RENDERING AFFECTED PIXELS

CROSS-REFERENCE TO RELATED APPLICATIONS

This application claims benefit of priority of U.S. Provisional Patent Application Ser. No. 61/651,361, filed May 24, 2012, entitled "RENDERING AFFECTED PIXELS", owned by the assignee of the present application and herein incorporated by reference in its entirety.

BACKGROUND

Movies presented in 3D are enjoying tremendous popularity. One way of achieving three-dimensional images is by way of stereography. In stereography two images are captured and presented to a user, one from a left camera and for the left eye of a viewer, and one from a right camera and for the right eye of a viewer. Stereography is one of the oldest ways of producing a 3D image for a viewer.

In creating two images instead of just one, stereography can entail significant costs in terms of processing power and time, however. In fact, with current technology and for certain particularly complicated shots, hundreds of hours may be required to render a single frame, and doubling this time for a second viewpoint or camera is prohibitive.

Accordingly, re-projection techniques have been developed to reuse pixel color values, rendered eye, for the other eye, by mapping the same to an appropriate point for the second view as determined by the scene geometry including the desired intraocular distance, and thus creating a 3D image. In one such technique, from a depth map a mesh is created and the mesh is rendered in a rendering package. The depth map is polygonalized from the point of view of the camera that rendered the depth map, and UV coordinates are assigned to the mesh. The mesh is then textured, and subsequently the mesh can then be rendered from any other point of view or viewing angle, e.g., from a right eye for a stereographic image.

However, such current re-projection techniques are slow and can lead to undesirable results.

In addition, to address artifacts, current re-projection techniques rely on stretching or compression of pixels, i.e., filling in stretched areas with pixels of the same color as neighboring pixels, or removing pixels in the case of compression, and such can lead to undesirable artifacts or even holes remaining on a re-projected image. Accordingly, a need exists for improved methods of such re-projection.

In a related aspect, for situations where dimensionalization is desired for images or movies shot originally without benefit of stereoscopy, a need exists for a convenient way to create a corresponding image for a second eye, to result in a stereo pair for 3D viewing.

SUMMARY

In one aspect, the invention is directed towards a system and method for using a depth map and a stereo camera pair to quickly create a novel view from an existing image. The system and method use the depth map and intraocular spacing to generate a disparity map and then a distortion map, which is used to create the new view. There is no need to build a mesh or other geometry or employ a renderer.

In yet another aspect, the invention is directed towards a system and method for addressing artifacts in re-projected images. In one implementation, a computer system renders pixels for a set of pixels identified as being undesirably affected by re-projection while creating a second image, e.g., the stereo image of a first image, which together form a stereoscopic pair. Other pixels are not rendered but only re-projected. Put another way, the process combines re-projection with rendering to create a new view which minimizes re-projection artifacts. In particular, from a re-projection method, a distortion map is employed to determine areas of excessive stretching or compression of neighboring pixels, such stretching present to avoid the appearance of holes. These areas are marked to be rendered. The re-projection and render from the new view are composited to create the new image. The system can save processing time and resources by rendering just a sliver of the available pixels, rather than all the pixels for an image.

In another aspect, the invention is directed towards a system and method of performing a depth layout process, in which a new offset view of a 2D plate is created, allowing a stereo pair of images where previously just a 2D plate existed. Using a match move camera, custom geometry that approximates the scene is generated and 2D rotomation or other matting techniques are applied to cut out shapes from that geometry to match or fit the images from the 2D plate. The scene is approximated and a depth map is created. A stereo camera created from the match move camera is then used with the depth map to calculate a disparity map between the two views. The disparity map is processed to create a distortion map. The distortion map is then applied to the original image to create an offset image. The two images then form the matching stereo pair.

In one aspect, the invention is directed towards a method for creating a desired second image based on a first image, including: receiving a first image from a first camera angle, the first image including at least one three-dimensional modeled object, a distance of the three-dimensional modeled object from a viewing plane known or determinable; creating a second image of the three-dimensional modeled object from a second camera angle different from the first; determining at least one set of pixels in the second image that appear unsatisfactory in the second image; rendering the one set of pixels that appear unsatisfactory in the second image; and replacing the set of pixels in the second image that appear unsatisfactory with the rendered pixels to create a desired second image.

Implementations of the invention may include one or more of the following. The creating a second image may be performed using a re-projection technique. The second image may be a stereo image of the first image. The determining may include determining if the at least one set of pixels form a hole, or are stretched or compressed to remedy a hole by greater than a predetermined amount. The rendering may include rendering only the set of pixels that appears unsatisfactory. The determining may be performed automatically. The determining may include employing a distortion map generation module to determined by how much pixels have been stretched or compressed in the second image, and may further include selecting pixels to be in the set if the same have been stretched or compressed by greater than respective predetermined thresholds. The determining may be performed with user input. The method may further include providing a user interface for displaying the second image and for accepting user input on which pixels should be in the set. The user interface may include a distortion map, the distortion map indicating by how much pixels have been stretched or compressed in the second image.

In another aspect, the invention is directed towards a non-transitory computer-readable medium, including instructions for causing a computing environment to perform the above method.

In another aspect, the invention is directed towards a system for creating a desired second image based on a first image, including: a second image creation module, the second image creation module for receiving a first image from a first camera angle, the first image including at least one three-dimensional modeled object, a distance of the three-dimensional modeled object from a viewing plane known or determinable, and for creating a second image of the three-dimensional modeled object from a second camera angle different from the first; a pixel determination module for determining at least one set of pixels in the second image that appear unsatisfactory; a pixel rendering module for rendering the one set of pixels that appear unsatisfactory; a pixel replacement module for replacing the set of pixels that appear unsatisfactory with the rendered pixels to create a desired second image; and a display module for displaying the desired second image.

Implementations of the invention may include one or more of the following. The second image creation module may employ a re-projection module to create the second image from the first image. The pixel determination module may include a user interface for displaying the second image and for accepting user input on which pixels should be in the set. The pixel determination module may include a distortion map generation module, the distortion map generation module for determining by how much pixels have been stretched or compressed in the second image. The pixel replacement module may replace pixels automatically based on if the pixels have been indicated as being stretched or compressed greater than respective predetermined thresholds. The pixel replacement module may replace pixels automatically. The pixel rendering module may form a part of a renderer module employing a fractional map capability and the pixel replacement module may form a part of a compositor module.

In a further aspect, the invention is directed towards a method for refining a second image, the second image a re-projection of a first image, including: identifying one or more discontinuities in a second image, where each discontinuity corresponds to one or more pixels in the second image, a plurality of areas of no discontinuities forming a remainder; rendering the pixels for the identified discontinuities; and compositing the rendered pixels with the remainder.

Implementations of the invention may include one or more of the following. The second image may be a stereo image of the first image. The identifying one or more discontinuities may include identifying one or more pixels which have departed from their locations in the first image by more than 25% relative to adjacent pixels.

In a further aspect, the invention is directed towards a method for creating a set of stereo images based on a plate including one or more features, where the plate has a corresponding first camera view, including: creating a first image corresponding to the first camera view by creating geometry for one or more objects in the plate; modifying the one or more objects in the plate to fit one or more features in the plate, the modifying using roto curves or mattes; creating a depth map for the first image using the modified objects; creating a second image, the first and second images forming a stereographic pair, the second image created using the depth map and a re-projection method, the re-projection method including: selecting a location for a second camera view; creating a disparity map indicating differences between the first camera view and the second camera view; creating a distortion map indicating pixel transforms based on the disparity map; and creating the second image by applying the distortion map to the pixels of the first image.

In yet another aspect, the invention is directed towards a method for creating a second image, the second image based on a first image, the first and second images forming a stereographic pair, including: receiving a first image corresponding to a first camera view, the first image including color values and a depth map for a set of pixels; creating a second image, the second image created using the depth map and a re-projection method, the re-projection method including: selecting a location for a second camera view; creating a disparity map indicating differences between the first camera view and the second camera view; creating a distortion map indicating pixel transforms based on the disparity map; and creating the second image by applying the distortion map to the pixels of the first image; and performing one or both of the following steps: applying a custom adaptive sharpening filter to one or more objects in the second image, the custom adaptive sharpening filter configured to increase a prevalence of high-frequency components and decrease a prevalence of low-frequency components; or for one or more objects in the first image, the one or more objects surrounded by a background or clipping plane, temporarily extending the object's size by 1-10 pixels whereby when re-projection occurs, pixels in the object are mapped properly during re-projection and not extended back to the background or clipping plane.

Advantages of certain implementations of the invention may include one or more of the following. Certain systems and methods of creating a novel view from an existing image can be performed without creating or rendering geometry and therefore are faster than previous techniques. Re-projection may be employed to more rapidly create a second view for a stereographic system, and undesirable artifacts due to the re-projection may be resolved. New views of static geometry may be provided from multiple angles in a compositing package. "Dialing" of stereo cameras, e.g., the altering of parameters such as intraocular distance may be desirably performed while viewing the result as applied to the input image, i.e., "image-based camera dialing". Other advantages will be apparent to one of ordinary skill in the art, given the description that follows, including the figures and claims.

BRIEF DESCRIPTION OF THE DRAWINGS

Like reference numerals denote like elements throughout.

DETAILED DESCRIPTION

Figure 1:
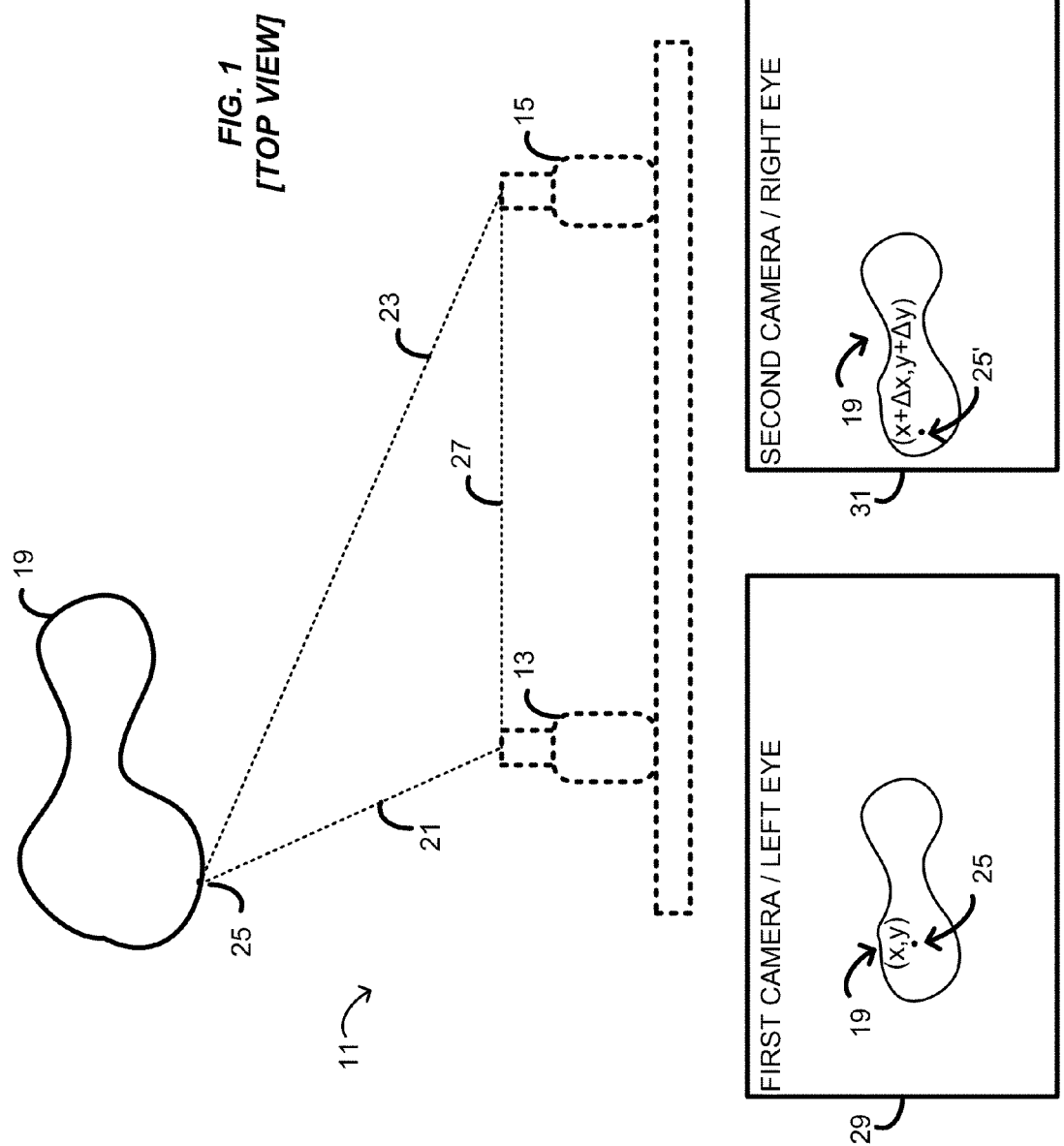
FIG. 1 illustrates a set of virtual stereo cameras imaging an object, as well as a view from each of the respective cameras.

FIG. 1 illustrates a schematic depiction of an exemplary system 11 for a fast re-projection technique. In FIG. 1, a first stereo camera 13 images an object 19, and an exemplary point 25 on the object is illustrated with a ray 21 extending between the point 25 and the camera 13. The intent of re-projection is to obtain a pixel color value for the point 25 as seen by a second stereo camera 15 without having to perform a lengthy rendering process. In essence, re-projection "re-uses" the pixel value as calculated for the left eye for the right eye. In the scenario of FIG. 1, so long as the distance 27 between the stereo cameras is known, and so long as the distance of the object 19 from a viewing plane (also termed the "camera plane") of one or both cameras is known, the location of the point 25 for a viewing plane of the second camera 15, and in particular its pixel color value, can be calculated. A ray indicating point 25 on the viewing plane of the second camera is shown by the ray 23.

Knowing depths allows the creation of a depth map. A depth map is a map of a depth value for every pixel (x,y), and the depth is the distance from the camera plane to the point being imaged by the pixel, e.g., a character, an object, a clipping plane, "infinity" (which is generally indicated as an arbitrary high number for depth), or the like. The depth map may be a rendered image that is calculated at the same time as the color image, where depth is an arbitrary output variable or AOV. The depth may be indicated in whatever units the rendered scene is in, e.g., centimeters.

Referring back to FIG. 1, also illustrated our views or viewing planes 29 and 31 for the first and second cameras, respectively. These illustrate where the point 25 from the left eye is transformed in space if applied to the right eye. In views 29 and 31, the point 25 at location (x,y) is transformed such that the same point appears in the second camera at (x+Δx,y+Δy), indicated by point 25'. In other words, the system has calculated a Δx and Δy for the pixel. If such is calculated for each pixel in the image, a disparity map is created, which indicates how many pixels are required for a translation, generally in the X and Y directions, to obtain a pixel color value from a point in a first camera, i.e., a point on a first viewing plane, to obtain where the color value should be placed in the second viewing plane. Every pixel from an original camera view can be mapped to a pixel in a new camera view. For example, a disparity map may indicate that a horizontal translation of 1.8 pixels is required to obtain views for a second camera relative to a first camera. In other examples, some pixels may move entirely off the screen and thus be unseen by the second camera, particularly where objects are very close to the first camera.

The calculated disparity map may then be employed to create a distortion map. The distortion map indicates information about what pixel information may be accessed in the original or first view to obtain a color value for a point in the new or second view. The distortion map then acts as a guide for what pixel in the first view should be accessed to obtain a color value for pixel in the second view. So if the pixel color value is translated by 100 pixels, and the original was at (0,0), the new would be (100,0). Thus, the second image can be created by applying the distortion map to the pixels of the first image.

In essence re-projection desirably "re-uses" pixel color values from the first camera view, negating the need to perform a rendering step to obtain values for the second camera view. Such reuse results in significant computational savings.

Re-projection requires depth information (as well as an (x,y) location) for each pixel to be re-projected. If an image from a live-action shot is employed, in many cases such depth information will be lacking. Cameras exist, however, which to a certain extent can obtain depth information from the objects imaged. Moreover, it is envisioned, and within the scope of the principles disclosed here, to employ live-action cameras that are even more enhanced and can obtain depth information for most if not all objects in a shot e.g., employing range imaging. This depth information for each pixel could be conveniently employed in certain methods disclosed here to create a second image for stereo photography.

Figure 2:
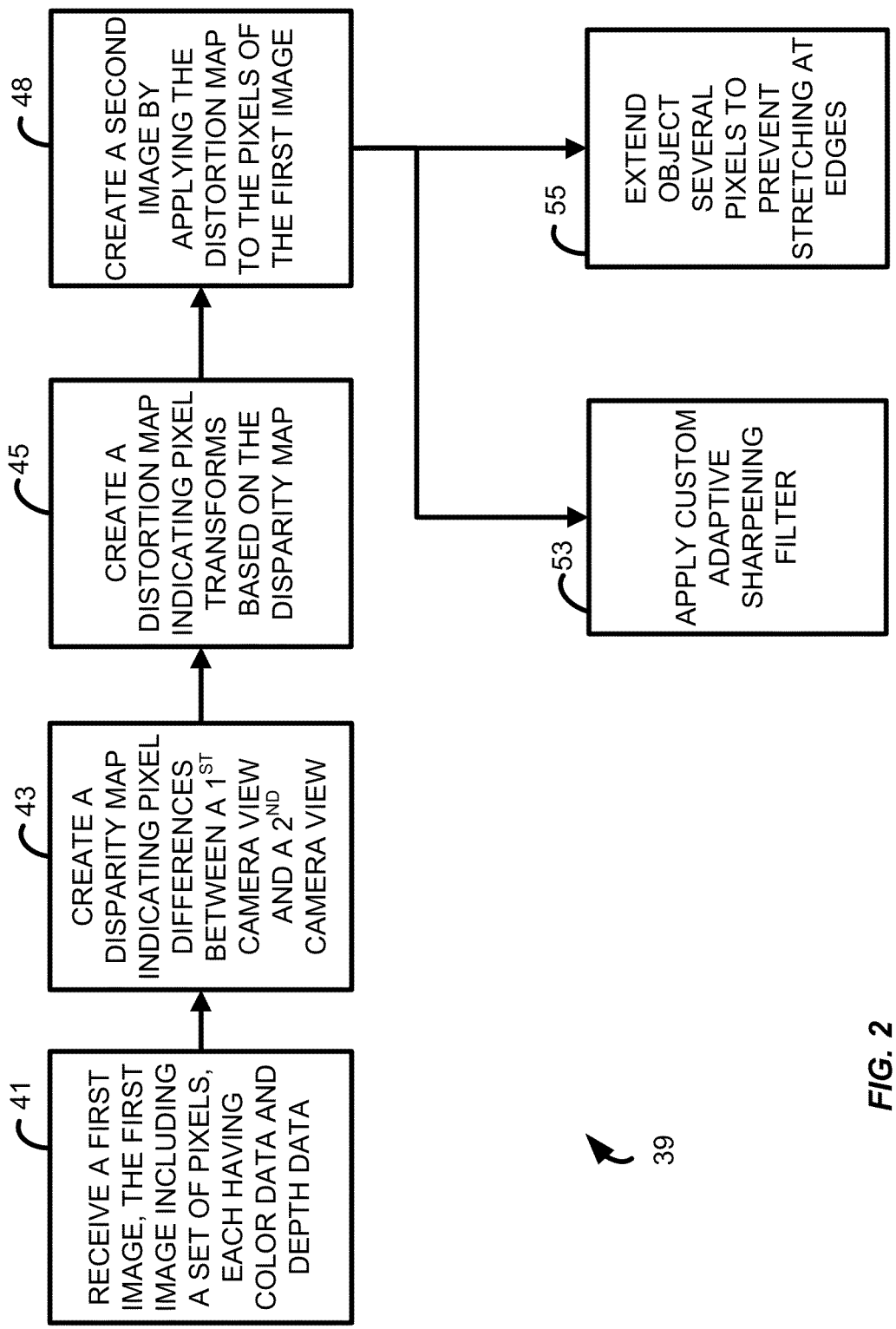
FIG. 2 is a flowchart of a method of re-projection according to the principles disclosed here.

FIG. 2 is a flowchart 39 of a method according to these principles. In a first step, a first image is received, the first image including a set of pixels, each having color data, depth data, and a location in the viewing plane (step 41). A next step is to create a disparity map indicating pixel differences between a first camera view and a second camera view (step 43). A next step is to create a distortion map indicating pixel transforms based on the disparity map (step 45). Essentially, the distortion map provides a recipe for creating pixel color values in the new or second view from those in the original. Finally, a second image may be created by applying the distortion map to the pixels of the first image (step 48).

Various steps may also be performed before, during, or after the re-projection. One exemplary step is the application of a custom adaptive sharpening filter (step 53). Such a custom adaptive sharpening filter can cause an emphasis of high-frequency components and a decrease of prevalence of low-frequency components. In more detail, when performing the re-projection, i.e., looking up new pixel values from original ones, on occasion an interpolation will have to be performed between two original pixels. If the system was designed to simply average the color values, a softening of the result would occur, and the same may in some cases be undesirable for particular effect. A lookup may be configured to use a kernel that attempts to preserve high-frequency detail.

Put another way, re-projection causes a mapping, and such mapping inherently involves resampling. Resampling usually causes a level of aliasing effects, and aliasing effects are generally pronounced at high-frequency areas. Thus, such a filter, which includes negative lobes, will reduce such aliasing effects and results in a higher-quality image.

Another step may be to extend the re-projection to edges around the perimeter of certain objects (step 55), e.g., objects surrounded by backgrounds where the backgrounds are far away such as at "infinity" or a clipping plane. A deleterious artifact of re-projection of such objects is that occasionally edge pixels may be stretched back to the background. By extending the object a few pixels in all directions, beyond its prior perimeter in the calculation, such artifacts are reduced because pixels are carried around the object as the view is changed, not allowing an edge to be pulled back to the clipping plane. A suitable number of pixels may be, e.g., 1 to 10 pixels distance away from the original edge of the object.

In yet another step, for a given frame of the re-projection, an average may be taken of images several frames before the given frame and several frames after. In this way, noise effects sometimes seen in re-projected images may be significantly reduced.

In some cases, re-projection can lead to artifacts due to stretching or compression of pixels, and one implementation of the system and method reduces or repairs such artifacts. From a re-projection method, which may be as disclosed above or from a different technique, the system and method use a distortion map to determine areas of excessive stretching or compression of neighboring pixels, including areas where holes exist. For example, discontinuities in the distortion map can indicate where stretching and compression have occurred. Such indicates a map of artifacts in the image. Rather than rendering the entire image to create a second view, the system need only render these identified areas, leaving the remainder to be obtained via re-projection. In one implementation, the system may also render additional pixels surrounding the identified artifacts. In any case, the re-projection and render from the new view are composited to create the new image.

Figure 3:
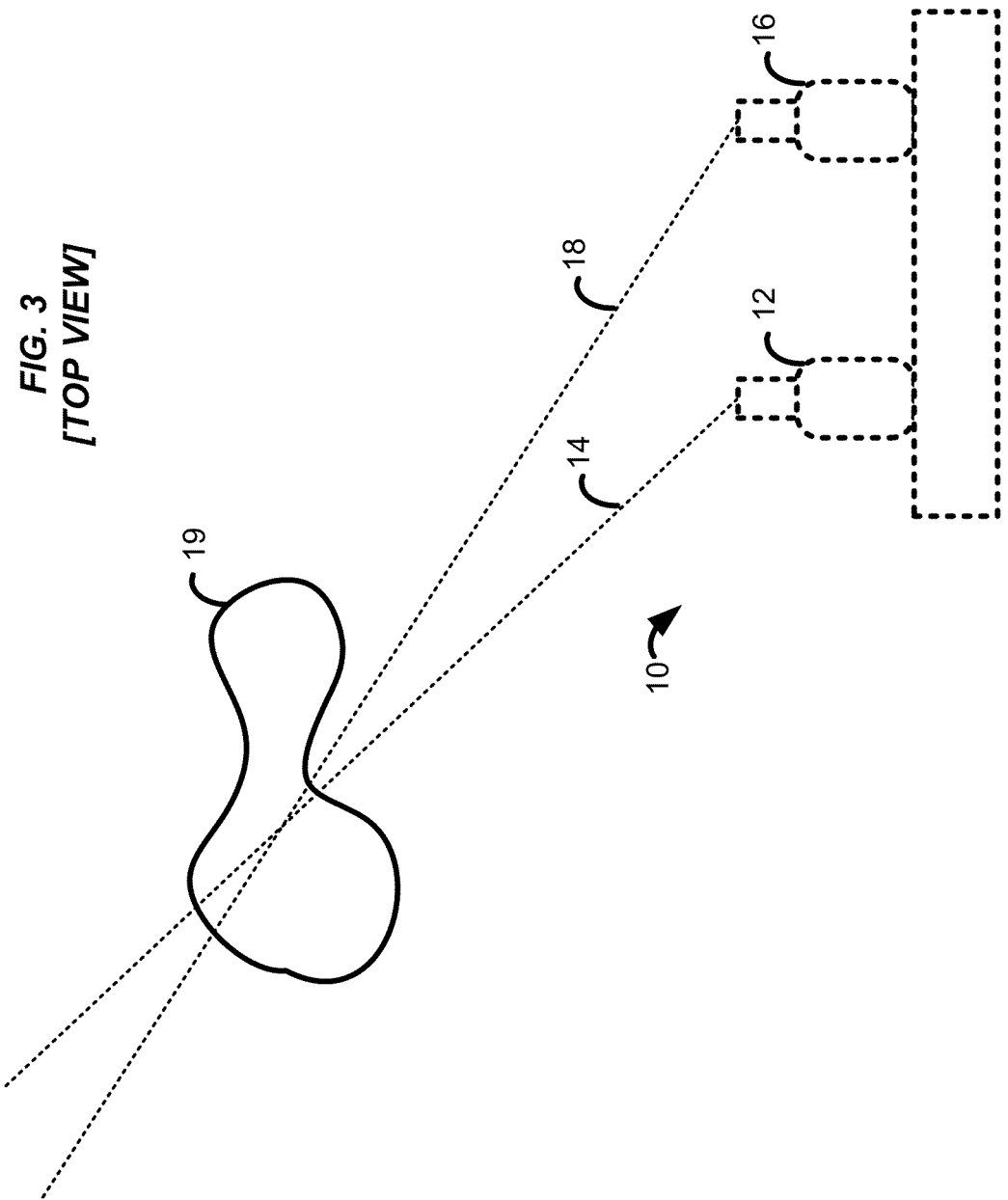
FIG. 3 is a schematic depiction of a set of virtual stereo cameras imaging an object.

In more detail, and referring to the system 10 of FIG. 3, a standard stereo graphic technique is illustrated in which a first stereo camera 12 and a second stereo camera 16 image an object 19 via rays 14 and 18, respectively. To process images using such virtual cameras, two distinct renderings are required, one for the left eye and one for the right eye, and such requires in many cases a large amount of processing time in complicated scenes. Such may be particularly true for scenes in which many lighting components are present, and in which multiple reflections are calculated for those lighting components.

Figure 4:
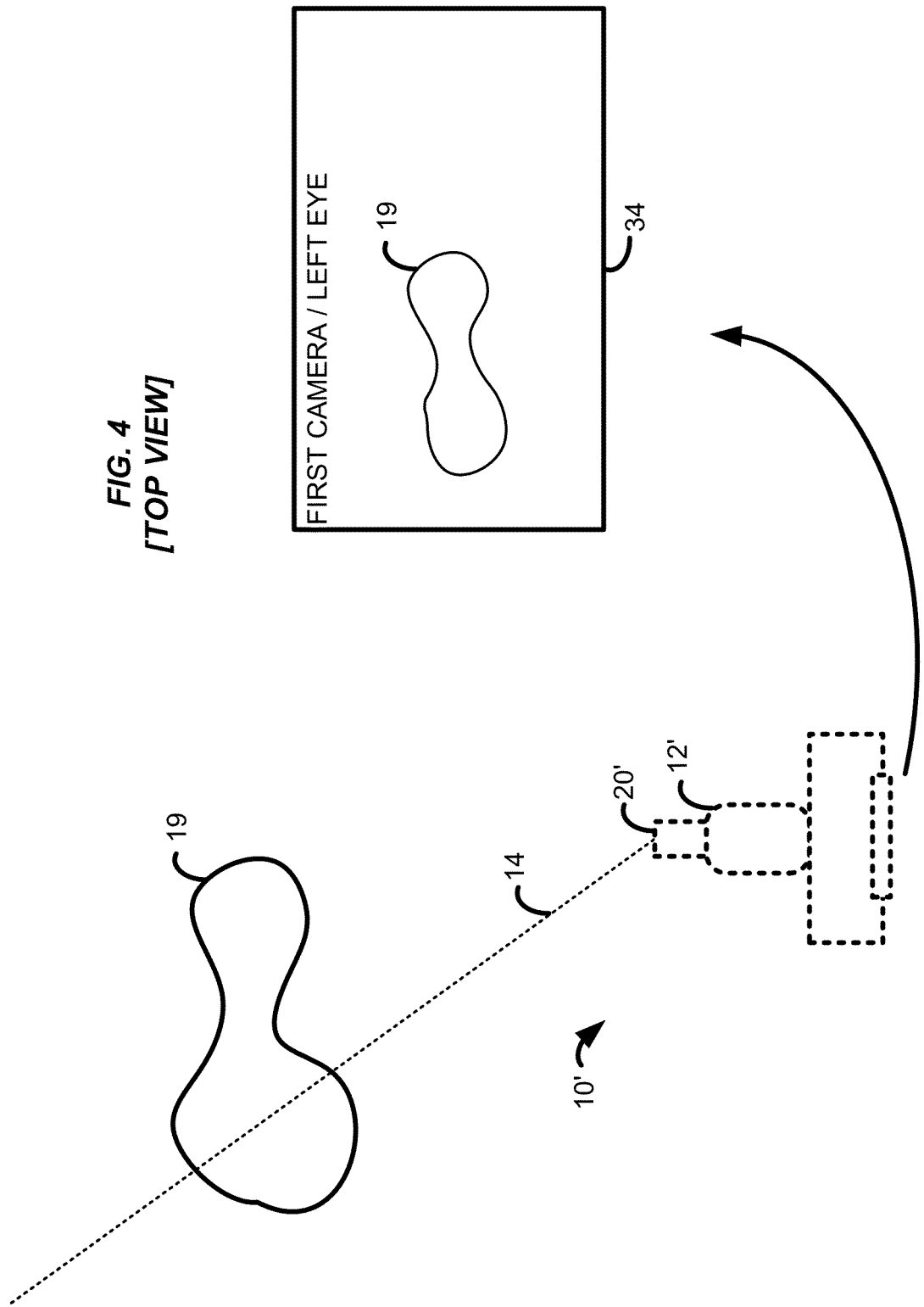
FIG. 4 is a schematic depiction of a single camera imaging an object.

Referring to FIG. 4, a system 10' may employ re-projection from an image of an object from a single camera 12' to reduce the complexity of such calculations, by reusing previously determined pixel values. In FIG. 4, the single camera 12' is illustrated imaging the object 19 with an exemplary ray 14'. A viewing plane 20' is illustrated, and an image 34 is shown, where the object 19 is generally depicted on the left side of the image.

Figure 5:
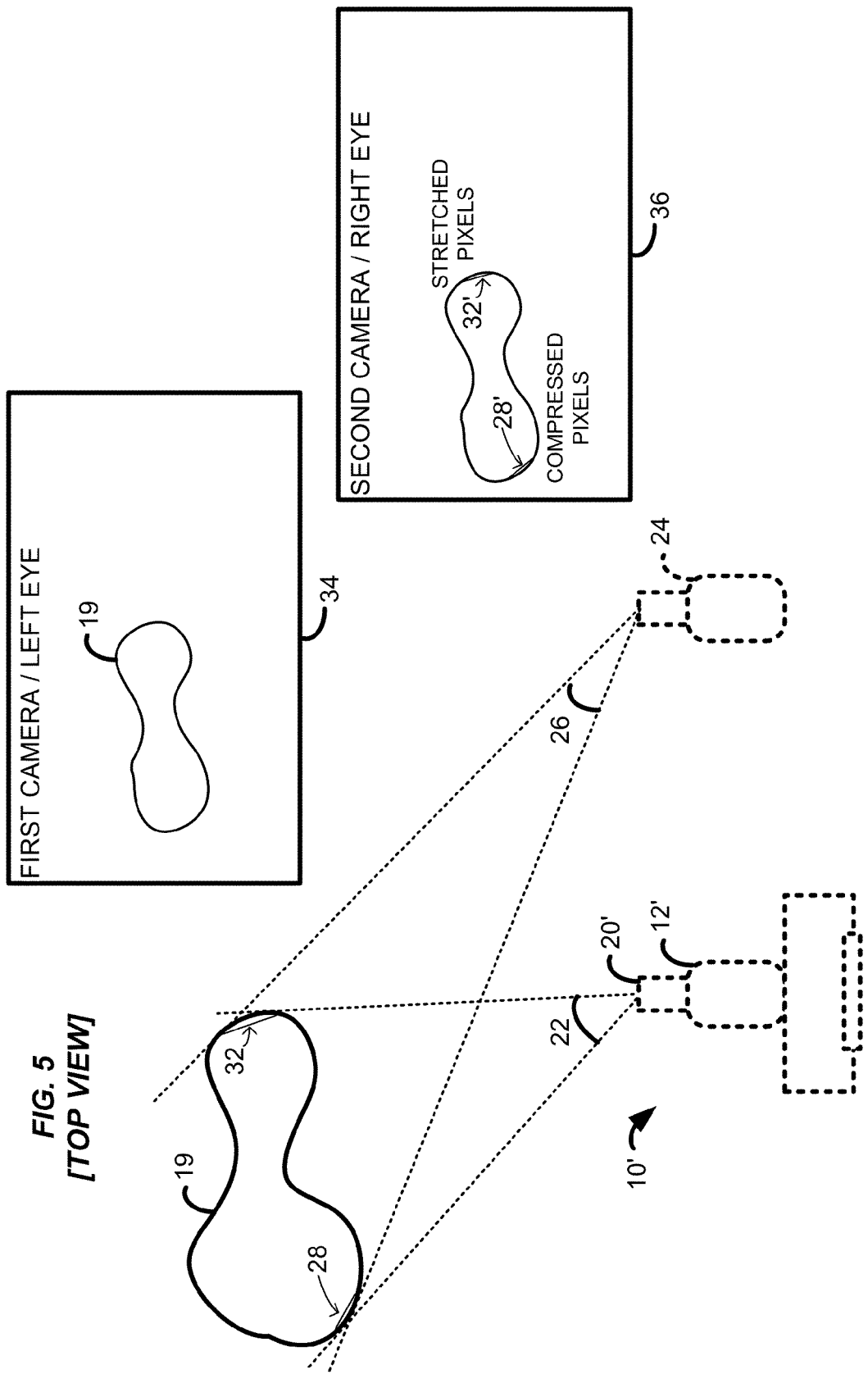
FIG. 5 is a schematic depiction of a situation where a re-projection technique is employed to determine a view from a second camera, as well as certain artifacts that can ensue.

In FIG. 5, a first camera 12' is illustrated as viewing the object 19 with a first viewing angle 22. In re-projection, the view for a second camera 24 is created using the techniques described above. The camera 24 is illustrated as visualizing the object 19 with a second viewing angle 26. Also shown in the figure is a rendered image 34 from the viewing plane 20' and a re-projected image 36 calculated from the image 34 (from a depth map) using the techniques disclosed above.

It is noted that, for some re-projected second images, pixels are revealed that were not visible in the first image. And certain pixels are not seen that were previously visible.

In some particularly stark examples, holes may be evident in re-projected images. Such cases are generally conditions for artifacts, and are termed "stretched" or "compressed" sets of pixels. For example, in the image 36, the set of pixels 28 in the object 19 are compressed and illustrated by the set 28'. Similarly, the set of pixels 32 in the object 19 are stretched and illustrated by the set 32'. These areas are shown for illustration, but it will be understood that other portions of the image may have affected pixels, e.g., in the interior, and particularly where the surface has areas of significant curvature.

In prior techniques, artifacts were treated by "stretching" pixels, meaning to fill in stretched areas with pixels having the same color as neighboring pixels. Pixels may also be removed in compression situations. The amount of compression or stretching may vary linearly, as opposed to being constant, in some advanced treatment techniques. However, such techniques still generally result in imperfect images which can be distracting to a viewer.

For such sets of pixels, i.e., those compressed or stretched by greater than a predetermined threshold, one solution is to render the compressed or stretched sets of pixels, rather than use the undesirable re-projected result (although re-projection may still be applied to the remainder). The rendered pixels are then composited with the re-projected remainder to result in a complete and satisfactory-looking second image, e.g., for a right camera view.

In some cases, it has been found that such rendering is desirable for about 5-20% of the pixels in an original image, and thus a significant savings in computation time may be achieved, with desirable image results.

Figure 6:
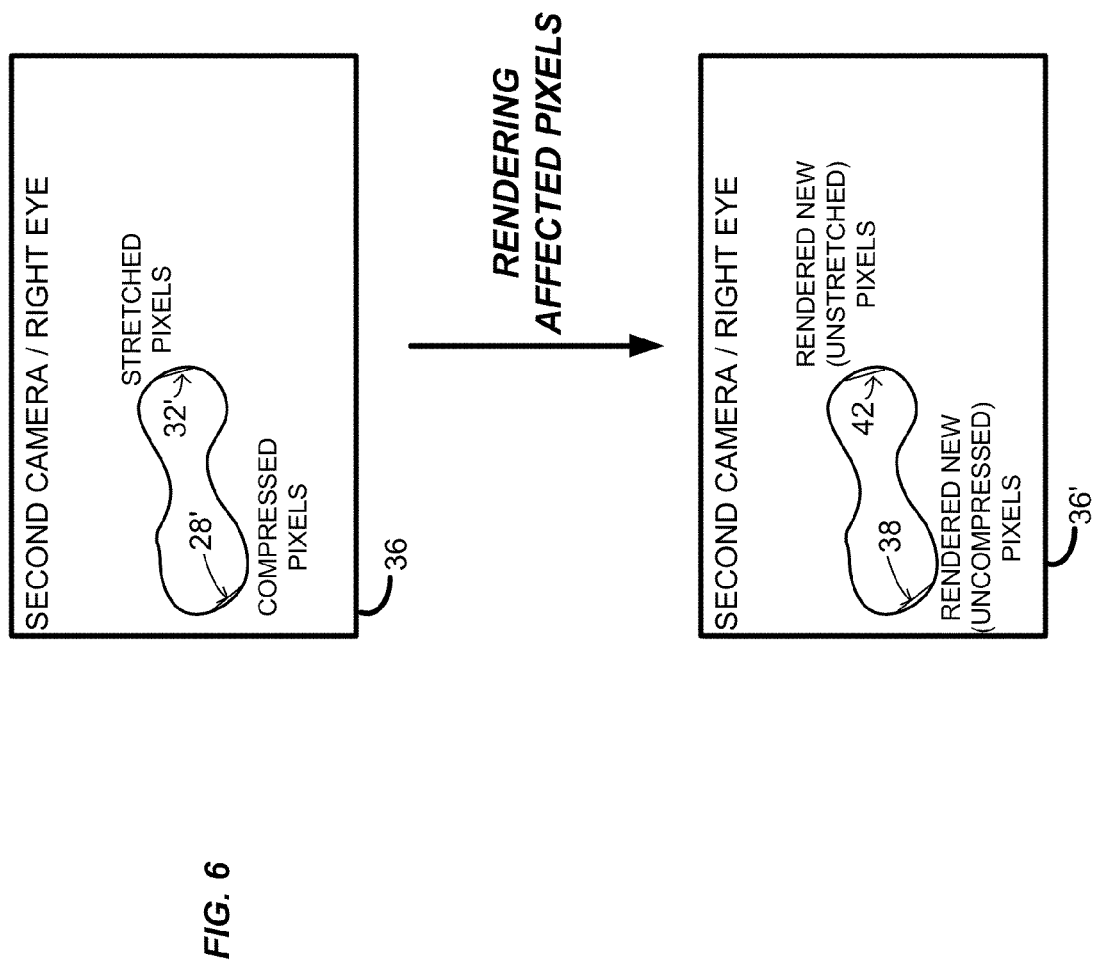
FIG. 6 is a schematic depiction of a solution for the artifacts of FIG. 5.

Schematic results are illustrated in the image 36' of FIG. 6, in which the compressed pixels 28' are rendered, resulting in essentially uncompressed pixels 38, and where stretched pixels 32' are rendered, resulting in essentially unstretched pixels 42.

The determination of which sets of pixels require rendering may be made automatically or with user input. In an automatic determination, holes can be determined by areas which are black or which otherwise do not contain certain pixel color values. Where stretching is employed to avoid holes, areas of significant compression or stretching may be computationally determined by how much a pixel is moved in a re-projection compared to adjacent pixels, by object analysis, e.g., the curvature of objects, how close the background is, how close the object is to the camera plane, or the like. For example, if two adjacent pixels that are one pixel apart are transformed or mapped together into a new image without becoming stretched or compressed, they are said to have a stretch value of one pixel, meaning that they are one pixel apart. Pixels may be flagged for rendering if they have a stretch value above, e.g., 1.25, meaning they are 1.25 pixels apart. In other words, they started one pixel apart and now they are stretched. Pixels may also be flagged for rendering if they have a stretch value of 0.75, meaning they are now closer together and compressed. It will be understood by one of ordinary skill in the art that, depending on computational ability and artistic desire, these values may vary.

In general, the closer an object is to the viewing plane, the more holes will exist, and the more stretching will be required to address the same. The system may analyze a distortion map for these purposes, as the same would indicate, for every pixel, how much a pixel is being moved.

In determinations employing user input, a user may indicate artifacts or other areas in which an image does not appear desirable. Typically, such areas occur around the edges of an object. Jaggedness or aliasing of portions may also indicate areas of compression or stretching.

Figure 7:
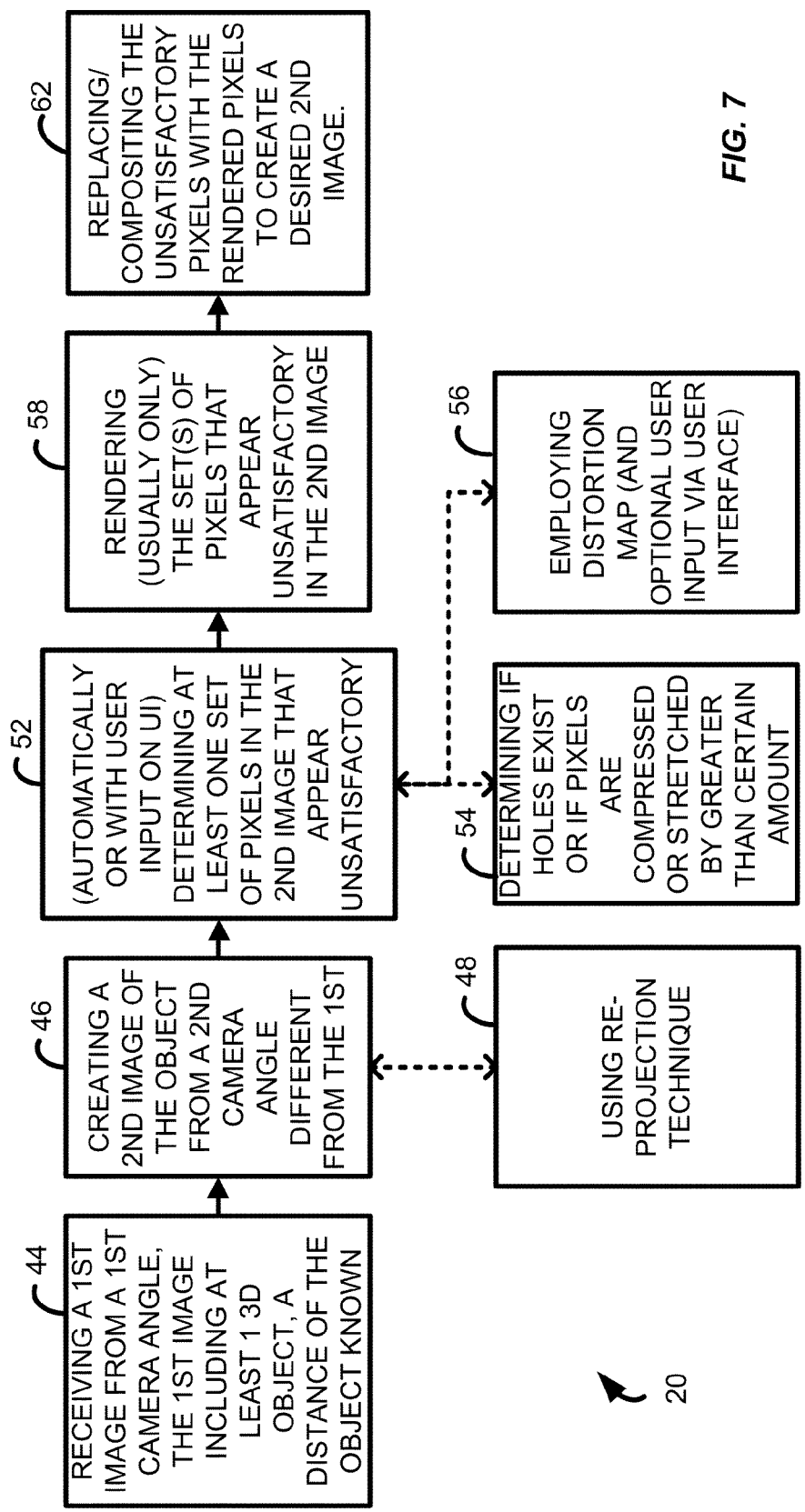
FIG. 7 is a flowchart of a method for resolving artifacts such as those in FIG. 5 according to the principles disclosed here.

FIG. 7 is a flowchart 20 indicating an exemplary method according to the principles disclosed here. A first step includes receiving a first image from a first camera angle, the first image including at least one 3D object, a distance of the object known. The point of reference of the known distance may vary, e.g., but the same generally corresponds to a distance from a viewing or camera plane of a first camera. It will be understood that the known distance may be derived from other known distances. The second step is the creation of a second image of the object from a second camera angle, the second camera angle different from the first camera angle (step 46). This step may be performed using one or more re-projection techniques disclosed above (step 48), although other methods of getting a second image are also contemplated.

A third step is to determine at least one set of pixels in the second image that appears unsatisfactory (step 52). This determination may be performed automatically or with user input employing a user interface. For example, the determination may be made as to whether holes are seen or determined to exist, if remedial compression or stretching is greater than a predetermined amount, or the like (step 54). The distortion map may also be employed (step 56), either as part of an automatic determination or to allow a user to analyze the distortion map to note areas for rendering.

Once a set of pixels is determined to require rendering, the rendering may occur (step 58), using a ray tracer or other such renderer. The rendered pixels may replace the unsatisfactory pixels to create a desired second image (step 62), e.g., in a compositor. In some cases, certain pixels around the perimeter of the undesired pixel set may also be rendered.

Figure 8:
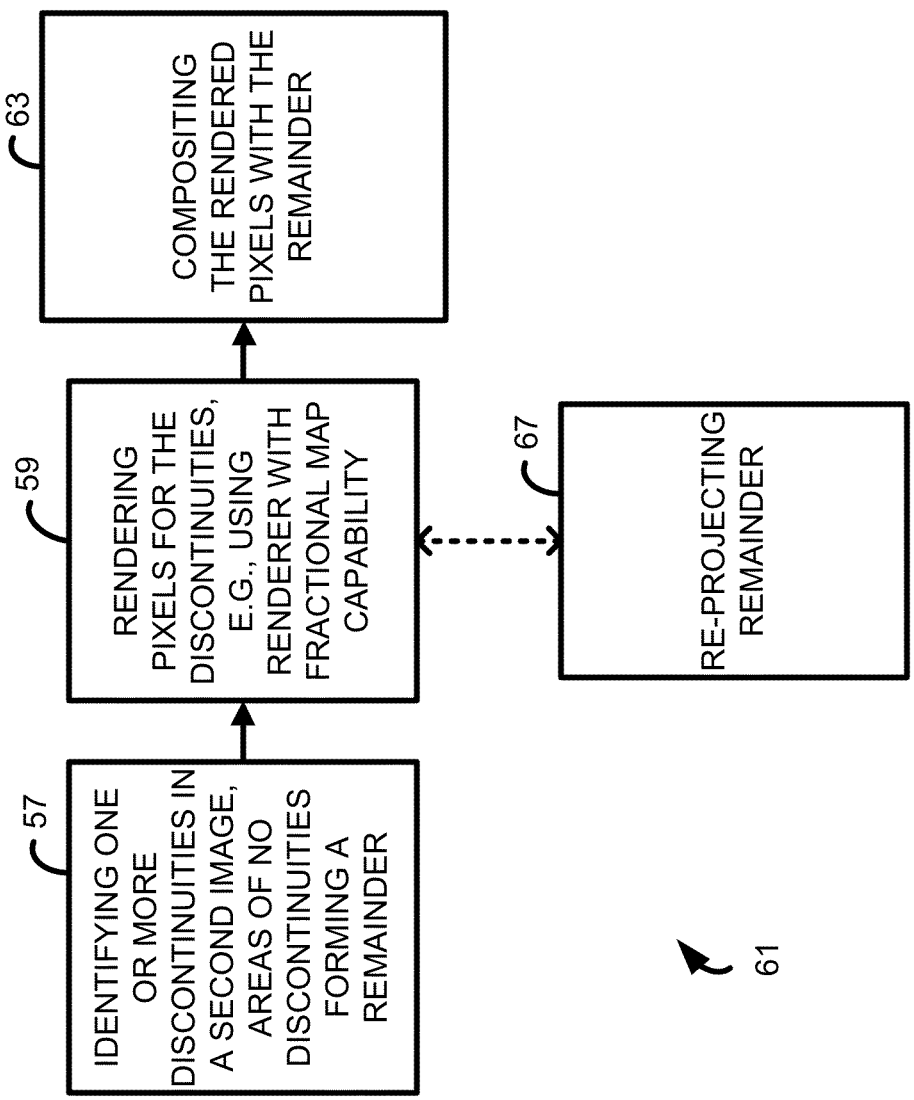
FIG. 8 is a flowchart of another method for resolving artifacts such as those in FIG. 5 according to the principles disclosed here.

FIG. 8 is a flowchart 61 of a related method. In the flowchart 61, a first step is to identify one or more discontinuities in the second image, with areas of no discontinuities forming a remainder (step 57). For the pixels in the discontinuities, rendering occurs, e.g., using a renderer with a fractional map capability (step 59). For pixels not in the discontinuities, i.e., in the remainder, a re-projection technique is employed to achieve a second view (step 67). The rendered pixels are then composited with the re-projected remainder (step 63).

Figure 9:
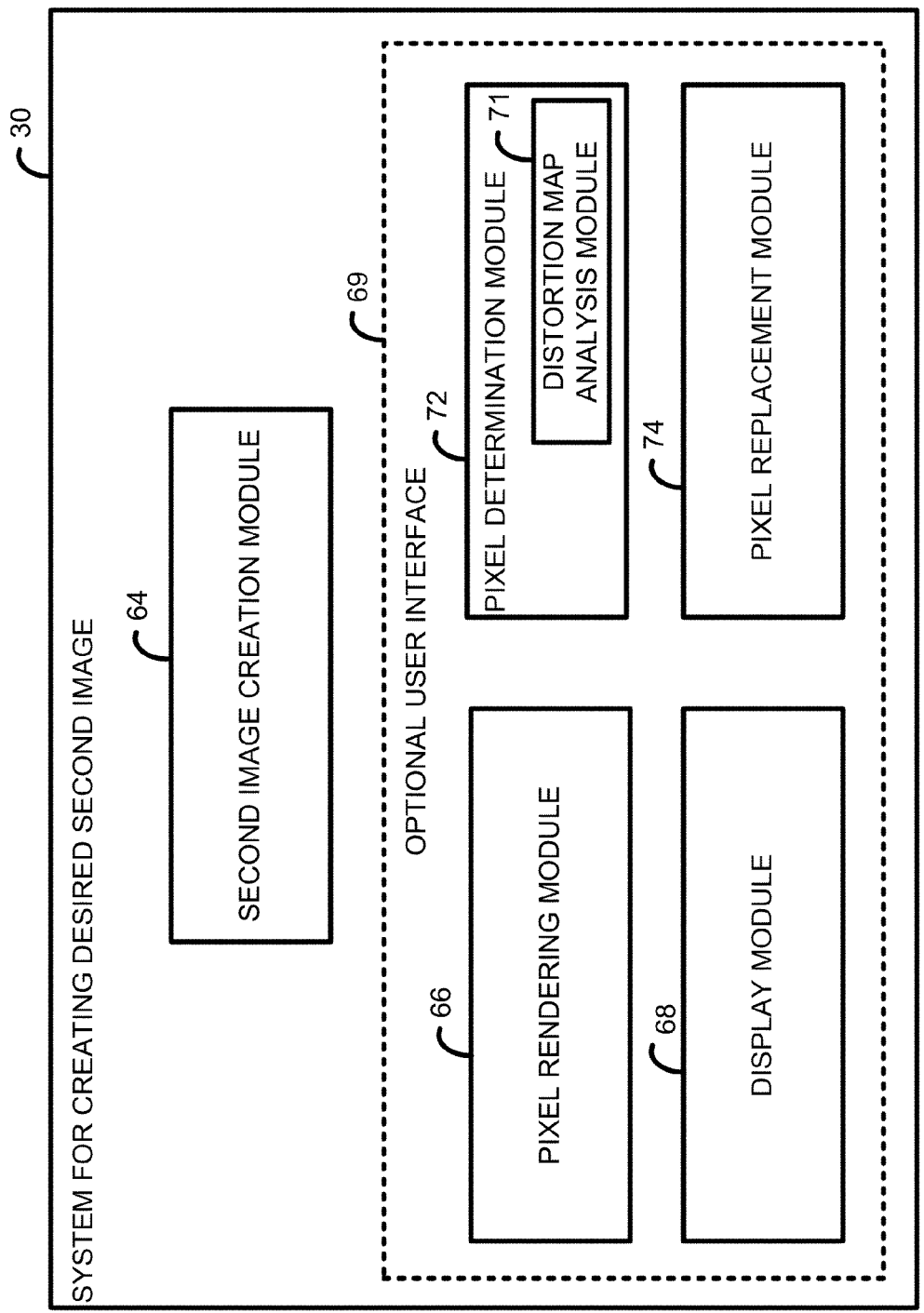
FIG. 9 is a modular depiction of a system according to principles disclosed here, for resolving artifacts such as those in FIG. 5.

FIG. 9 illustrates a modular system 30 for creating a desired second image according to principles disclosed here. The system 30 includes a second image creation module 64, which may employ re-projection or another technique to obtain a second camera image from an original or first camera image. Various other modular components are employed, and some of these may be within an optional user interface 69. A pixel determination module 72 may be employed to determine a set of pixels which represent artifacts or discontinuities in a re-projected image, e.g., areas of significant compression or stretching, e.g., beyond a predetermined threshold amount. The pixel determination module 72 may include a distortion map analysis module 71, as a distortion map may be employed by the pixel determination module to determine the areas for rendering. A pixel rendering module 66 may be employed to render the areas determined in the module 72, where the pixel rendering module 66 generally forms part of a larger rendering system. A pixel replacement module 74 may be provided for replacing the unsatisfactory pixels with the rendered pixels, and the same may form part of a compositor. A display module 68 may be provided for viewing an original image, viewing a re-projected image, identifying areas of discontinuities or otherwise unsatisfactory portions or artifacts caused by significant pixel stretching or compression, and for viewing fractional rendered images and composited images.

Figure 10:
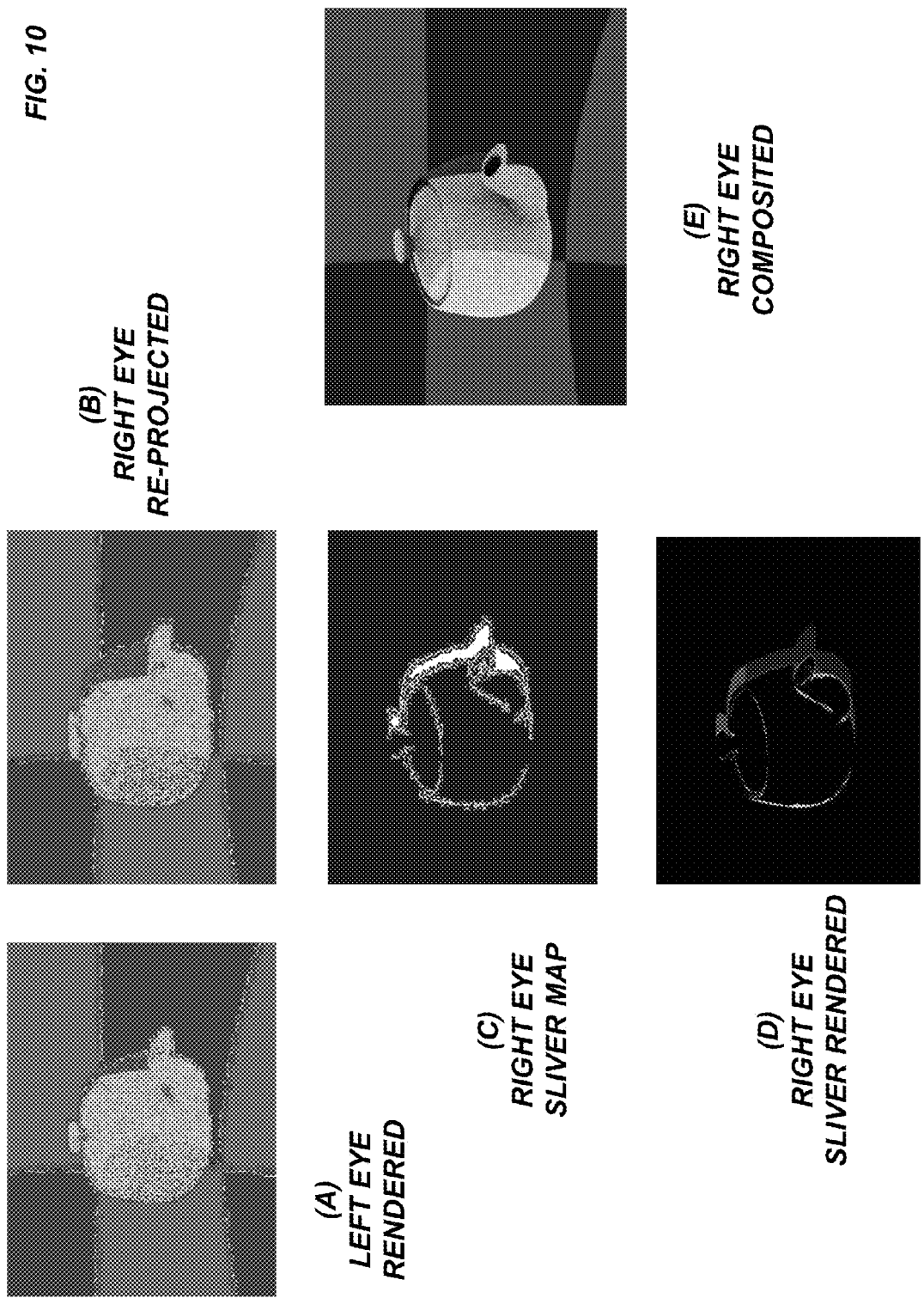
FIG. 10 illustrates an exemplary situation including an artifact and the solution thereof by systems and methods according to the principles disclosed here.

FIGS. 10(A)-(E) illustrate an example of an implementation of the above system and method. In FIG. 10(A), the rendered image of a teapot from a left eye viewpoint is illustrated. Following re-projection of this image, the right eye view is shown in FIG. 10(B). Significant areas of stretching are shown on the right hand side of the teapot, and significant areas of compression, though less visible, are also present on the left side of the teapot. A "sliver" map for the right eye is shown in FIG. 10(C), termed "slivers" because such analysis often results in "slivers" of pixels being determined as being stretched or compressed. The sliver map indicates in white color areas of such discontinuities, and in black color areas where pixels are translated but only stretched a lesser amount, e.g., below a predetermined threshold, e.g., areas where pixels tend to move together as a group when mapped from the left eye to the right eye. FIG. 10(D) illustrates a rendering of the pixels in the slivers, and FIG. 10(E) illustrates a composition of FIGS. 10(B) and 10(D), where the rendered pixels from FIG. 10(D) replace the stretched or compressed pixels from FIG. 10(B). The result in FIG. 10(E) is a desirable and satisfactory image created with significantly less computational effort than using prior techniques.

In another aspect of the principles disclosed here, for 2D images, depth information may be obtained by a simulation, and such information may be later employed in re-projection or the like to obtain a second camera view for what was originally just a 2D image. In this way, depth or dimensionalization may be created through stereoscopic images where such depth did not exist before.

Figure 11:
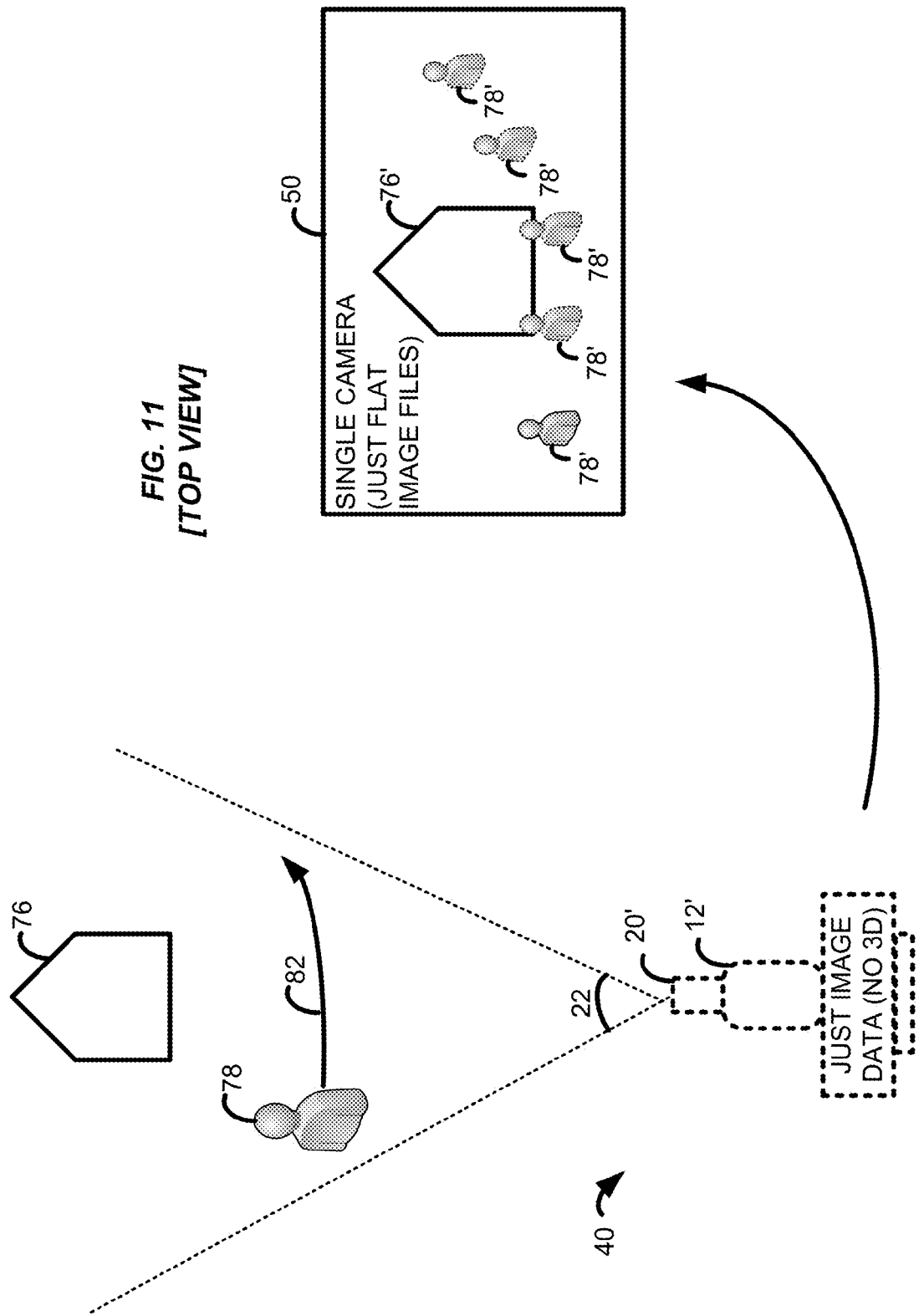
FIG. 11 illustrates a situation giving rise to a 2D movie, where each frame represents an image with no accompanying depth information.

In this implementation, the system and method may start with a scene that was shot with just one camera, and then may create a new offset view of a 2D plate or image, resulting in a stereo pair of images. Referring to FIG. 11, a system 40 includes a single camera 12' that images a scene with at least a partial field of view 22. In FIG. 11, the scene includes a house 76 and a character 78 who moves along a path 82. As the scene is not shot in stereo, depth information is not obtained, although as noted above some current 2D cameras and likely many future ones may record depth information at the same time as recording image information.

An image 50 is recorded at a viewing or camera plane 20'. It will be understood that the image 50 is but one of many images that, when viewed in sequence, create a motion picture. The flat or 2D image 50 includes several features, such as a depiction 76' of the house 76, which is stationary, and a depiction 78' of the character 78, the depiction moving, as indicated by the dotted-line progressive character placements in the figure.

It is noted that a number of reasons may exist for not originally shooting the scene in stereo. For example, in some cases, existing footage was taken before the advent of stereo cameras. Stereo cameras may be too expensive to operate or too unwieldy for some scenes. In some cases, a director's preference may be to use non-stereo cameras. Numerous such reasons may exist, and yet a desire may be to later dimensionalize or create a depth for such images.

Figure 12:
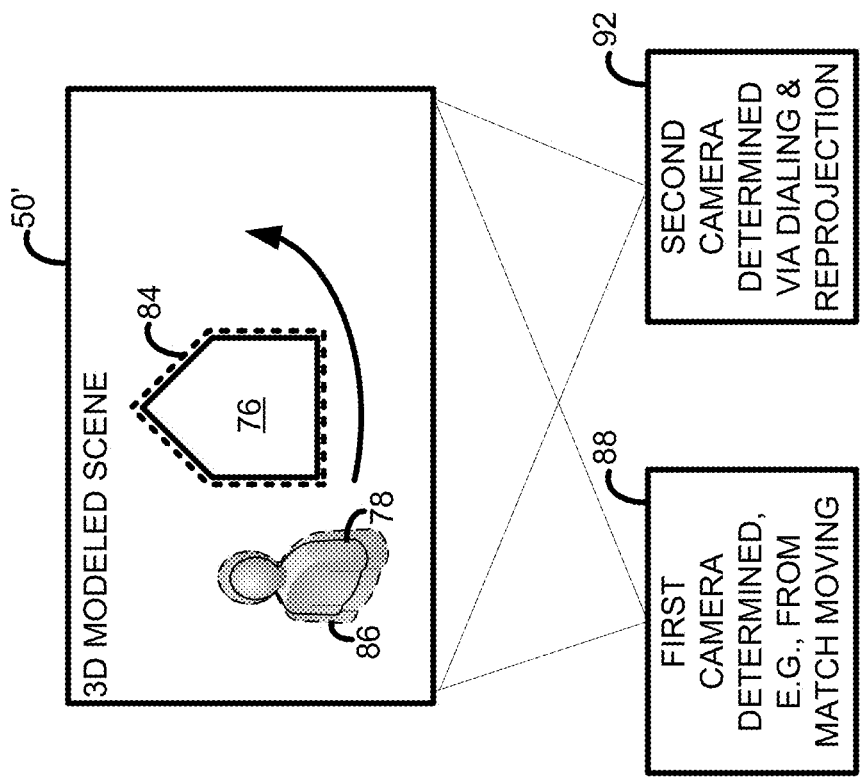
FIG. 12 illustrates a schematic depiction of a depth layout configuration for creating a three-dimensional image from a two-dimensional one.

Following the receiving of a 2D image, a next step may be to determine where the camera was located. A first camera 88 is illustrated in FIG. 12 for such purposes. Such determination may be by way of match moving or other techniques. A next step is to create scene geometry, and the same may employ rough three-dimensional models or objects onto which may be mapped images from the original scene. These rough three-dimensional models or objects are not generally rendered, with lighting effects, or the like. They are generally only employed to create a depth map for future creation of a second view.

A next step is to create the equivalent geometry for the scene. In a 3D modeled image 50' corresponding to the original image 50, a CG character 86 has been overlaid above the character 78, and a CG structure of a house 84 has been overlaid atop house 76. In practice it is extraordinarily difficult to match CG objects with features in a scene, and even more difficult to match CG characters with figures from a native plate. In particular, deleterious results may ensue if the match is not nearly perfect. For example, if the CG model is too large for the character, background elements may be pulled out of the background and imaged on the portion of the CG model that is larger, as that larger portion would be considered the valid depth of the pixel. Thus a step of 2D rotoscoping may be performed, which in known fashion allows match move of CG characters. In this step, portions of the CG model need not be actually removed to match the figure in the native plate, but rather the depth of the pixels of the character are only valid within the roto curve or matte. Otherwise, outside the roto curve, the depth is that of the background, which may itself include roto curves for trees, bystanders, or the like.

Subsequently, values and a respective depth for each pixel are determined, and thus a depth map can be created. Once a depth map is created, re-projection may be employed, e.g., using disparity and distortion maps as disclosed above, to obtain a second angle or view, resulting in a stereographic 3D image.

Generally, a stereographic second eye does not take an extreme angle with respect to the first, and in most cases the re-projected image will be sufficient for the desired dimensionality. However, for certain images, aspects of the re-projected image may be repaired for the right eye, e.g., where a large amount of stretching occurs, and such repairs may be via painting or other such remedies.

In a method according to one implementation, the system and method use a match move camera, custom geometry that approximates the scene, and 3D rotomation for animated characters. The system builds or accesses geometry for the objects in the scene. The system then uses 2D roto curves or mattes to isolate objects in the plate, i.e., in the first image, and applies those areas to the geometry. The system next trims the geometry to match the rotoscoped or matted area. The system builds a depth image or depth map from the resulting geometry. A stereo camera created from the match moves camera is then used with the depth map to calculate a disparity map between two views. The system processes the disparity map as indicated above to create a distortion map, indicating the transform to be applied to each pixel. The distortion map is then applied to the original image to create an offset image. The two images then form the matching stereo pair.

Numerous advantages may inure. For example, the system can create the second image without creating or rendering significant new geometry, i.e., beyond the rough geometry employed to obtain the depth map (which is not textured, lit, rendered, or the like), allowing the system to make new views of static geometry from multiple angles in a compositing package. The system may also be employed to "dial" or adjust stereo cameras while viewing the result as applied to the input image, i.e., "image-based camera dialing".

Figure 13:
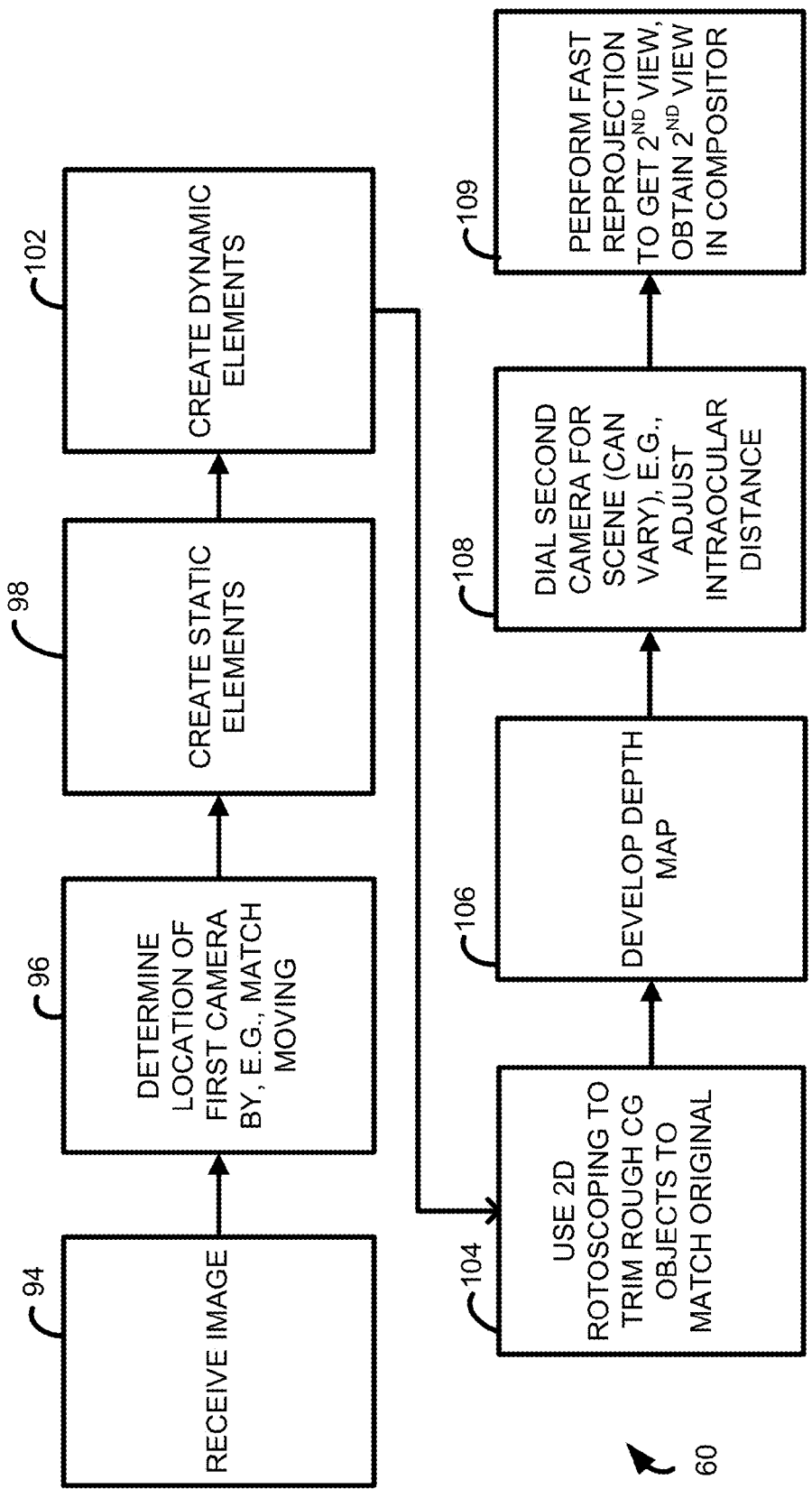
FIG. 13 is a flowchart for performing a depth layout method according the principles disclosed here.

FIG. 13 is a flowchart 60 pertaining to an exemplary method according to the principles disclosed here. In a first step, an image is received, the image generally being a two-dimensional one lacking depth information (step 94). A location of a first camera may be determined by, e.g., match moving (step 96). Elements in the received image may then be modeled by CG objects, with a first step the generation of static or non-moving elements (step 98). Such may include structures, tables, flooring, and the like. A next step is the creation of dynamic or moving elements (step 102). Dynamic or moving elements may include vehicles, characters, or the like. 2D rotoscoping may be employed to make sure the edges of the created geometric elements match up with the edges of the figure in the original image (step 104). The edges may be made to line up by simply cutting the model off at the edge, and removing pixels, or in more advanced techniques, pushing or pulling fabric or skin to an edge so that a desired artistic effect is achieved.

Generally, points of a roto curve are adjusted to match the image in the original scene, with more points required for scenes involving hair or other fine details. The roto curve essentially defines a matte, which is black or white. Within the roto curve a white value notes that a valid pixel is one which is on the character. Outside the roto curve, a black value indicates that a valid pixel is that which is behind the character. It will be understood, however, that other methods may also be employed, e.g., pulling a key color, or the like.

Following the roto step, a depth map may then be determined (step 106), as a depth value is then determinable for each pixel. A second camera may be dialed (step 108) as artistically desired, with the image for the second camera obtained via re-projection (step 109) or other techniques. The dialing of the second camera may adjust the distance of the second camera from the first along the intraocular line so that the scene is artistically controlled. It may be particularly important for high-quality detailed images for attention to be paid to "inner depth", or the perceived depth between objects, as well as object distance to a background.

It is noted that the re-projection step 109 may be performed using the fast re-projection technique described above in connection with FIGS. 1 and 2. Moreover, a significant savings in time may occur because the second view, obtained via re-projection, is obtained at a compositing stage rather than at a rendering stage. As such, the speed of the process is vastly increased and artists may be given more control over the final result, providing significant advantages over prior techniques.

A further advantage of the above process is that, from within a computer graphics modeling software program, e.g., Autodesk Maya®, tools may be constructed to visualize the effects of the method from within the software, as opposed to only seeing the effects after a rendering.

Figure 14:
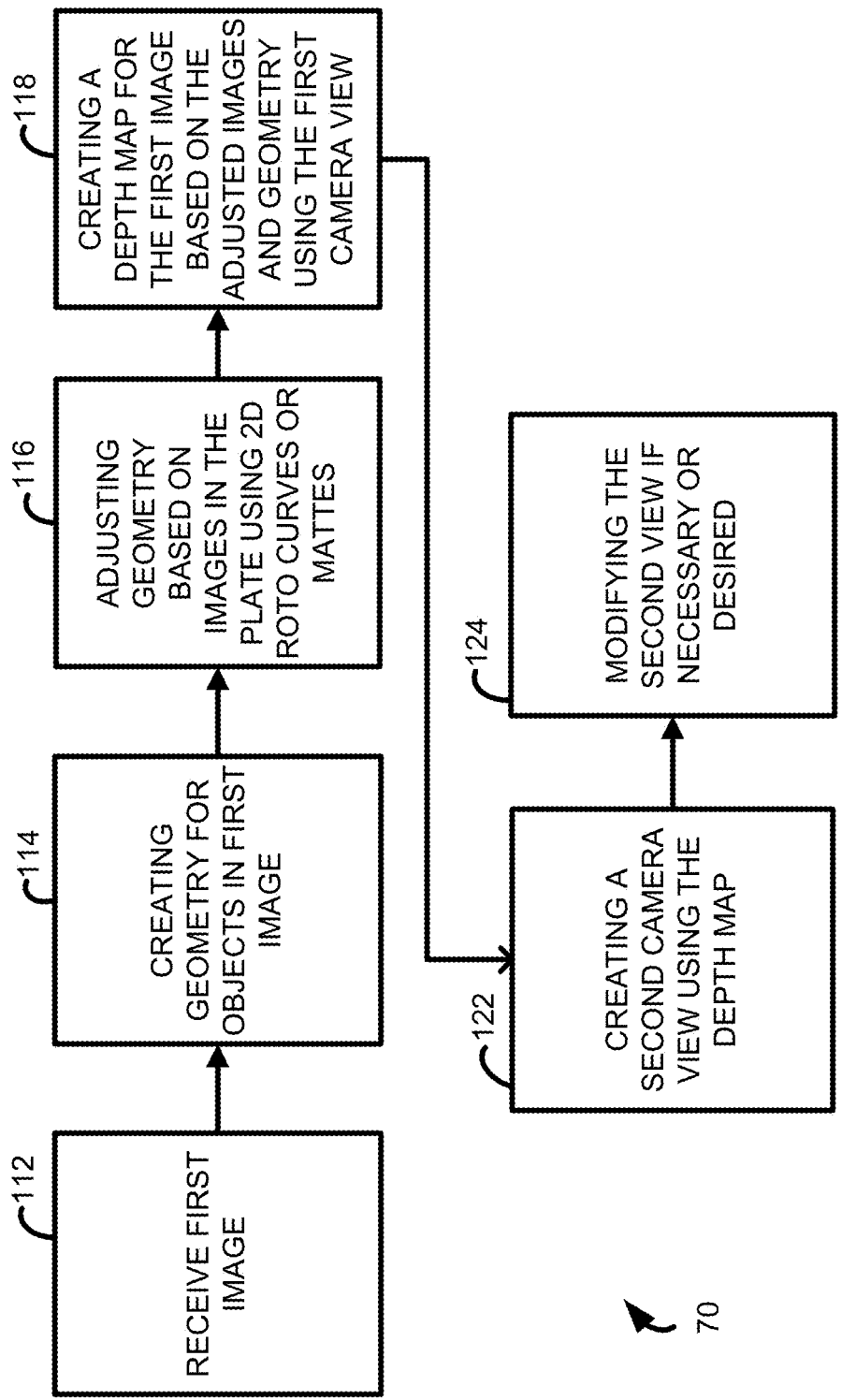
FIG. 14 is a flowchart for performing another depth layout method according the principles disclosed here.

FIG. 14 is a flowchart 70 of a related implementation of a depth layout method. In a first step, a first image is received (step 112). Geometry is then created for one or more objects in the first image (step 114). Typically, geometry will be created for all important objects in the first image, although this will vary based on the artistic design. The geometry may then be adjusted based on images in the plate using 2D roto curves or mattes (step 116). In other words, the created geometric objects or models are modified to match or fit the images in the 2D plate. A depth map is then created for the first image based on the adjusted images and geometry using the first camera view (step 118). Once the depth map is created, a second camera view from another angle may be created using the depth map (step 122) and a known intraocular distance. The second camera view may be modified if necessary or desired (step 124). In other words, if artifacts exist in the reprojection which created the second camera view, these may be remedied in this step.

What has been described are systems and methods for reducing artifacts from re-projection, performing faster re-projection to reduce the processing time required to create stereo views, and improved methods of creating stereoscopic views based on 2D images.

One implementation includes one or more programmable processors and corresponding computer system components to store and execute computer instructions, such as to provide the tools for creating the depth and distortion information, creating images, and identifying artifacts of re-projection. One such computing environment is disclosed below.

Figure 15:
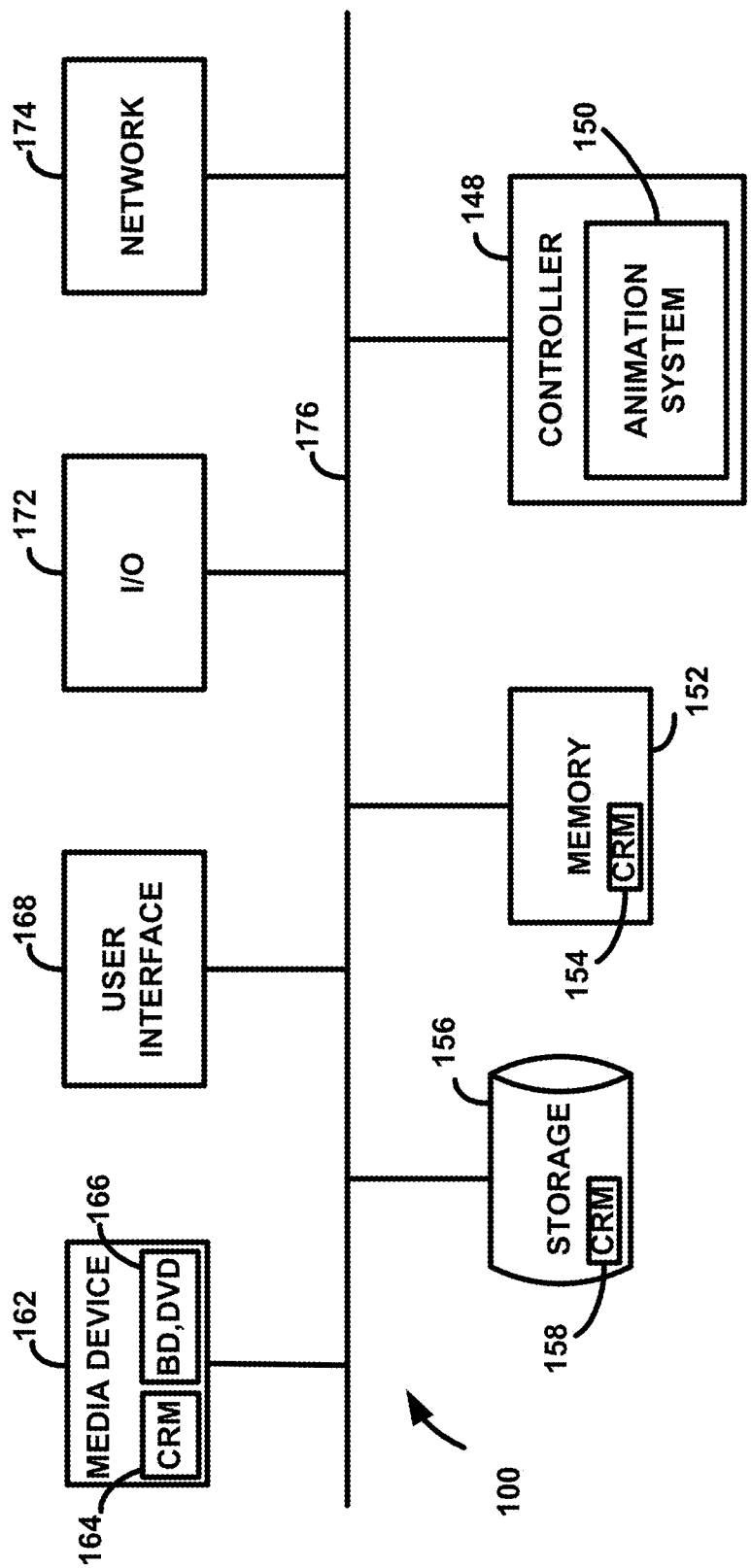
FIG. 15 illustrates an exemplary computing environment in which systems according to principles disclosed here may be situated, and using which methods may be performed.

Referring to FIG. 15, a representation of an exemplary computing environment 100 for an animation workstation is illustrated.

The computing environment 100 includes a controller 148, a memory 152, storage 156, a media device 162, a user interface 168, an input/output (I/O) interface 172, and a network interface 174. The components are interconnected by a common bus 176. Alternatively, different connection configurations can be used, such as a star pattern with the controller at the center.

The controller 148 includes a programmable processor and controls the operation of an animation system 150. The controller 148 loads instructions from the memory 152 or an embedded controller memory (not shown) and executes these instructions to control the system.

Memory 152, which may include non-transitory computer-readable memory 154, stores data temporarily for use by the other components of the system. In one implementation, the memory 152 is implemented as DRAM. In other implementations, the memory 152 also includes long-term or permanent memory, such as flash memory and/or ROM.

Storage 156, which may include non-transitory computer-readable memory 158, stores data temporarily or long-term for use by other components of the system, such as for storing data or instructions. In one implementation, the storage 156 is a hard disc drive or a solid state drive.

The media device 162, which may include non-transitory computer-readable memory 164, receives removable media and reads and/or writes data to the inserted media. In one implementation, the media device 162 is an optical disc drive or disc burner, e.g., a writable Blu-ray® disc drive 166.

The user interface 168 includes components for accepting user input, e.g., the user indication of artifacts or other aspects discussed above, and presenting a display, e.g., of rendered or re-projected images, to the user. In one implementation, the user interface 168 includes a keyboard, a mouse, audio speakers, and a display. The controller 148 uses input from the user to adjust the operation of the computing environment.

The I/O interface 172 includes one or more I/O ports to connect to corresponding I/O devices, such as external storage or supplemental devices, e.g., a printer or a PDA. In one implementation, the ports of the I/O interface 172 include ports such as: USB ports, PCMCIA ports, serial ports, and/or parallel ports. In another implementation, the I/O interface 172 includes a wireless interface for wireless communication with external devices. These I/O interfaces may be employed to connect to one or more content playback devices.

The network interface 174 allows connections with the local network and includes a wired and/or wireless network connection, such as an RJ-45 or Ethernet connection or "Wi-Fi" interface (802.11). Numerous other types of network connections will be understood to be possible, including WiMax, 3G or 4G, 802.15 protocols, 802.16 protocols, satellite, Bluetooth®, or the like.

The system may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and are within the scope of the present invention. For example, the disclosed systems and methods can be applied to images from movies, television, video games, etc. In another example, the second or digital images can be created from a first image to make alternate views or previews, not only for stereoscopic images. In one such example, a sequence of images are created from a first image to form a preview sequence.

Accordingly, the present invention is not limited to only those implementations described above.

The invention claimed is:

1. A method for creating a desired second image based on a first image, comprising:
   a. receiving a first image from a first camera angle, the first image including at least one three-dimensional modeled object, a distance of the three-dimensional modeled object from a viewing plane known or determinable;
   b. creating a second image of the three-dimensional modeled object from a second camera angle different from the first, the creating a second image performed using a reprojection technique;
   c. automatically determining at least one set of pixels in the second image that appear unsatisfactory in the second image, wherein the determining includes determining if a set of pixels forms a hole, or are stretched or compressed to remedy a hole, by greater than a predetermined amount, by employing a distortion map generation module to determine by how much pixels have been stretched or compressed in the second image, and selecting pixels to form a set if the same have been stretched or compressed by greater than respective predetermined thresholds;
   d. rendering only the at least one set of pixels that appears unsatisfactory in the second image; and
   e. replacing the at least one set of pixels in the second image that appear unsatisfactory with the rendered pixels to create a desired second image.

2. The method of claim 1, wherein the second image is a stereo image of the first image.

3. The method of claim 1, wherein the determining is performed with user input.

4. The method of claim 1, further comprising providing a user interface for displaying the second image and for accepting user input on which pixels should be in the set.

5. The method of claim 4, wherein the user interface includes a distortion map, the distortion map indicating by how much pixels have been stretched or compressed in the second image.

6. A non-transitory computer-readable medium, comprising instructions for causing a computing environment to perform the method of claim 1.

7. A system for creating a desired second image based on a first image, comprising:

a. a second image creation module, the second image creation module for receiving a first image from a first camera angle, the first image including at least one three-dimensional modeled object, a distance of the three-dimensional modeled object from a viewing plane known or determinable, and for creating a second image of the three-dimensional modeled object from a second camera angle different from the first using a reprojection technique;

b. a pixel determination module for automatically determining at least one set of pixels in the second image that appear unsatisfactory, wherein the pixel determination module is configured to determine if at least one set of pixels appears unsatisfactory by determing if at least one set of pixels forms a hole, or are stretched or compressed to remedy a hole, by greater than a predetermined amount, by employing a distortion map generation module to determine by how much pixels have been stretched or compressed in the second image, and selecting pixels to form a set if the same have been stretched or compressed by greater than respective predetermined thresholds;

c. a pixel rendering module for rendering only the at least one set of pixels that appears unsatisfactory;

d. a pixel replacement module for replacing the at least one set of pixels that appears unsatisfactory with the rendered pixels to create a desired second image, wherein the remainder of the pixels in the second image are formed by the reprojection technique; and e. a display module for displaying the desired second image.

8. The system of claim 7, wherein the pixel determination module includes a user interface for displaying the second image and for accepting user input on which pixels should be in the set.

9. The system of claim 7, wherein the pixel rendering module forms a part of a renderer module employing a fractional map capability and wherein the pixel replacement module forms a part of a compositor module.

10. A method for refining a second image, the second image a re-projection of a first image, comprising:

a. automatically identifying at least one discontinuity in a second image, the second image created by a reprojection technique, where each discontinuity corresponds to a set of pixels in the second image, a plurality of areas of no discontinuities forming a remainder, wherein the identifying includes
determining if one or more pixels form a hole, or are stretched or compressed to remedy a hole by greater than a predetermined amount, by
employing a distortion map generation module to determine by how much pixels have been stretched or compressed in the second image, and selecting pixels to form a set if the same have been stretched or compressed by greater than respective predetermined thresholds;

b. rendering only the sets of pixels for the identified discontinuities; and c. compositing the rendered pixels with the remainder.

11. The method of claim 10, wherein the second image is a stereo image of the first image.

12. The method of claim 10, wherein the identifying one or more discontinuities includes identifying one or more pixels which have departed from their locations in the first image by more than 25% relative to adjacent pixels.

13. A method for creating a set of stereo images based on a plate including one or more features, where the plate has a corresponding first camera view, comprising:

a. creating a first image corresponding to the first camera view by creating geometry for one or more objects in the plate;

b. modifying the one or more objects in the plate to fit one or more features in the plate, the modifying using roto curves or mattes;

c. creating a depth map for the first image using the modified objects;

d. creating a second image associated with a second camera view, the first and second images forming a stereographic pair, the second image created using the depth map and a re-projection method, the re-projection method comprising:
  i. selecting a location for a second camera view, the location selected by adjusting an intraocular distance between the first camera view and the second camera view;
  ii. creating a disparity map indicating differences between the first camera view and the second camera view;
  iii. creating a distortion map indicating pixel transforms based on the disparity map;
  iv. creating the second image by applying the distortion map to the pixels of the first image; and
  v. modifying the second camera view if necessary or desired.

14. A method for creating a second image, the second image based on a first image, the first and second images forming a stereographic pair, comprising:

a. receiving a first image corresponding to a first camera view, the first image including color values and a depth map for a set of pixels;

b. creating a second image associated with a second camera view, the second image created using the depth map and a re-projection method, the re-projection method comprising:
  i. selecting a location for a second camera view, the location selected by adjusting an intraocular distance between the first camera view and the second camera view;
  ii. creating a disparity map indicating differences between the first camera view and the second camera view;
  iii. creating a distortion map indicating pixel transforms based on the disparity map;
  iv. creating the second image by applying the distortion map to the pixels of the first image; and
  v. modifying the second camera view if necessary or desired; and c. performing one or both of the following steps:
  i. applying a custom adaptive sharpening filter to one or more objects in the second image, the custom adaptive sharpening filter configured to increase a prevalence of high-frequency components and decrease a prevalence of low-frequency components; or
  ii. for one or more objects in the first image, the one or more objects surrounded by a background or clipping plane, temporarily extending the object's size by 1-10 pixels whereby when re-projection occurs, pixels in the object are mapped properly during re-projection and not extended back to the background or clipping plane.

* * * * *